United States Patent [19]
Chang et al.

[11] Patent Number: 5,694,351
[45] Date of Patent: Dec. 2, 1997

[54] METHOD AND APPARATUS FOR GENERATING DEGREE OF MEMBERSHIP IN FUZZY INFERENCE

[75] Inventors: George Chang; Paul Chen, both of Taichung; Jason Chen, Ilan, all of Taiwan

[73] Assignee: Holtek Microelectronics, Inc., Taiwan, Taiwan

[21] Appl. No.: 611,793

[22] Filed: Mar. 6, 1996

[51] Int. Cl.$^6$ ............................. G06G 7/00; G06F 15/18
[52] U.S. Cl. ............................. 364/807; 395/3; 395/900
[58] Field of Search ............................. 364/807; 395/3, 395/61, 900

[56] References Cited

U.S. PATENT DOCUMENTS

| | | | |
|---|---|---|---|
| 5,305,251 | 4/1994 | Shigeoka et al. | 364/807 |
| 5,335,314 | 8/1994 | Tsutsumi et al. | 395/3 |
| 5,495,574 | 2/1996 | Miyazawa et al. | 395/3 |
| 5,542,027 | 7/1996 | Thornber | 395/3 |

*Primary Examiner*—Tan V. Mai
*Attorney, Agent, or Firm*—Barnes, Kisselle, Raisch, Choate, Whittemore & Hulbert, P.C.

[57] ABSTRACT

A method and apparatus for determining the degree of membership in a fuzzy inference by using a subtractor and a divider without the need for a complicated multiplication, division circuit or software that is normally required in a conventional method. A fuzzy inference database for the degree of membership is first established in a microprocessor by a fuzzy inference method, the membership function in the fuzzy database has a range between 0 to 1 at full scale for the degree of membership function. When the microprocessor detects an input data, a slope distance ratio and the corresponding coordinates are determined and compared using the input data and the fuzzy database established in the microprocessor. The ratio determined by the greatly simplified method is the degree of membership function.

16 Claims, 2 Drawing Sheets

METHOD AND APPARATUS FOR GENERATING DEGREE OF MEMBERSHIP IN FUZZY INFERENCE

FIELD OF THE INVENTION

The present invention generally relates to a method and apparatus for generating the degree of membership in a fuzzy inference calculation and more particularly, relates to a method and apparatus for generating the degree of membership in a fuzzy inference calculation by a simplified procedure which requires a subtractor and a divider without the need for complicated multiplication/division calculations.

BACKGROUND OF THE INVENTION

Fuzzy inference has been used in recent years in the mechanical automation industry to provide intelligent control of mechanical devices. More recently, the application of fuzzy inference has been extended to household appliance applications.

In a fuzzy inference calculation, the convenience and reliability of digitized data transmission are utilized to treat digitized data in a continuously step-wise manner. For instance, when the fuzzy inference is used in an air conditioning system for temperature control, fuzzy inference calculation is performed by a complex microprocessor circuitry. In the circuitry, an important procedure for the fuzzy inference implementation is the calculation of the degree of membership function of the fuzzy inference rule. A conventional fuzzy inference circuit requires complicated circuit design in order to achieve high precision, a high execution speed and the an optimum degree of membership calculation. The fabrication process for a conventional fuzzy inference circuit is therefore high cost and difficult to carry out. As a result, conventional fuzzy inference circuits cannot be competitively used in household appliance applications where low manufacturing costs, single function and high efficiency are the critical requirements.

It is therefore an object of the present invention to provide a method and apparatus for generating the degree of membership in a fuzzy inference circuit that does not have the drawbacks and shortcomings of a conventional fuzzy inference circuit.

It is another object of the present invention to provide a method and apparatus for calculating the degree of membership in a fuzzy inference circuit that only requires the calculation steps of subtraction and division.

It is a further object of the present invention to provide a method and apparatus for generating the degree of membership in a fuzzy inference circuit that utilizes a substraction and a division method for the calculation of a slope in order to obtain the degree of membership.

It is still another object of the present invention to provide a method and apparatus for generating the degree of membership in a fuzzy inference circuit based on the word size in a microprocessor to set up a fuzzy inference database.

It is yet another object of the present invention to provide a method and apparatus for generating the degree of membership in a fuzzy inference circuit by providing a distance ratio between two horizontal coordinates and a horizontal coordinate variable from the microprocessor input data.

It is another further object of the present invention to provide a method and apparatus for generating the degree of membership in a fuzzy inference circuit that can be used in low cost, single function, high efficiency household appliances market competitively.

It is still another further object of the present invention to provide a method and apparatus for generating the degree of membership in a fuzzy inference circuit by simplifying the calculation of the degree of membership function in the fuzzy inference circuit in order to achieve reduced circuit area and reduced memory space requirement in the microprocessor.

SUMMARY OF THE INVENTION

In accordance with the present invention, a method for calculating the degree of membership in a fuzzy inference circuit can be carried out. The method simplifies the conventional degree of membership calculation that requires the calculation of a slope by complicated multiplication and division steps so that only subtraction and division are necessary to calculate the degree of membership in a fuzzy inference circuit. A fuzzy inference database of the degree of membership functions generated by the fuzzy inference rules is first established in the microprocessor, the membership function in the fuzzy database has a range between 0 degree of membership to 1 which is the full scale degree of membership function. When the microprocessor detects an input data, a slope distance ratio and the corresponding coordinates are determined and compared using the input data and the fuzzy database established in the microprocessor. The ratio determined by this greatly simplified method is the degree of membership function.

The present invention is further directed to an apparatus for determining the degree of membership in a fuzzy inference circuit. The apparatus includes a first memory device for storing a membership function, a first subtraction device for subtracting a second coordinate from a first coordinate and outputting the result of the first difference, a second subtracting device for subtracting the second coordinate from a third coordinate of the input variable data for outputting a second difference, a numerator memory device for storing numerator memory data to obtain the results of adding 1 to the full scale degree of membership function and then multiplying by the second difference, a third subtraction device for subtracting the second difference from the numerator memory data, a divider for dividing the numerator memory data by the third difference and then outputting the degree of membership function of the third coordinate, and an arbiter for inputting a slope signal such that the degree of membership function can be subtracted from the full scale degree of membership when the slope is negative.

BRIEF DESCRIPTION OF THE DRAWINGS

Other objects, features and advantages of the present invention will become apparent upon consideration of the specification and the appended drawings, in which.

DETAILED DESCRIPTION OF THE PREFERRED EMBODIMENT

The present invention provides a method and apparatus for a simplified method of calculating degree of membership function in a fuzzy inference circuit by utilizing the methods of subtraction and division. The present invention achieves the benefits of reducing the circuit area required, reducing the memory space used in a microprocessor, increasing the calculation efficiency and reducing the manufacturing cost.

Figure 1:
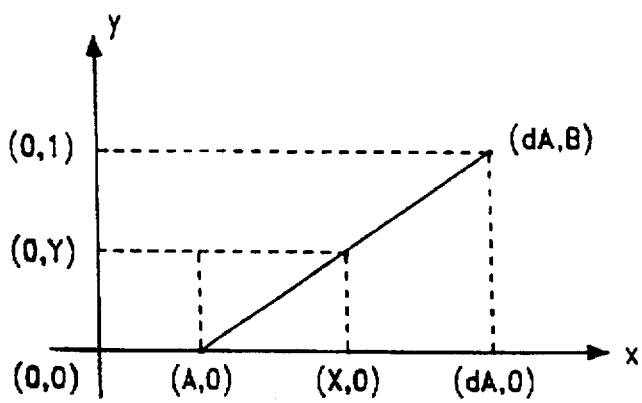
FIG. 1 is a graph showing the membership function for a single sloped linear line.

Referring initially to FIG. 1, where it is shown a membership function of a straight line which has a positive single slope. The horizontal axis is a reference coordinate and the vertical axis indicates the degree of membership.

$$\text{Degree of membership function} = \{B*(X-A)\}/(dA-A) \ldots \quad (1)$$

In the above equation, B is the full scale degree of membership function expressed in bits. When the microprocessor is expressed in n bits, full scale is when the degree of membership is "1". For instance, the full scale degree of membership of a 4 bits can be expressed in a binary function as "1111", which is equivalent to "15" in a decimal system. The degree of membership is expressed in such a way similar to a number being divided into 15 partitions. A number expressed in such a fine scale improves the degree of precision.

Figure 2:
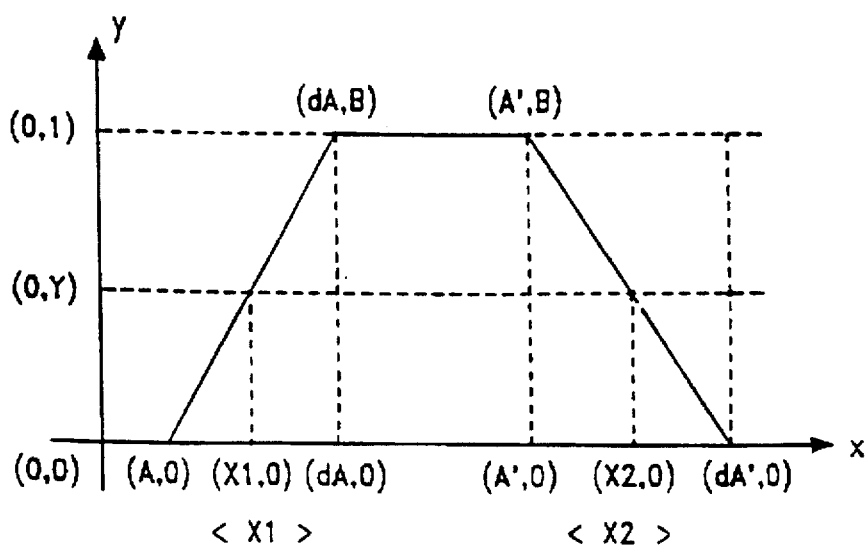
FIG. 2 is a graph showing the membership function for a trapezoid.

Referring now to FIG. 2, wherein a trapezoid membership function diagram is shown. The slopes of the two hypotenuse are a positive slope and a negative slope. The relationship between the left, the right horizontal reference coordinate and the vertical axis degree of membership function are illustrated below:

Degree of membership Function 1 = Degree of membership Function 2   (2)

(Degree1) = (degree2)
$\{B * (X1 - A)\}/(dA - A) = B - \{B * (X2 - A')/(dA' - A')\}$ As shown in the above equation, B is the full scale degree of membership. If m bits is expressed and its degree of membership is "1", it is in a full scale condition. When a full scale degree of membership of a 5 bits is expressed in a binary function as "11111", it can be converted to "31" in a decimal system.

However, in the above equations where the degree of membership is calculated, multiplication devices must be used.

In the present invention method, the equation 1:

$$\text{Degree} = \{B*(X-A)\}/(dA-A)$$

can be converted to:

$$\{(B+1)*(X-A)-(X-A)\}/(dA-A) \ldots \quad (3)$$

while equation 2:

$$\{(B*(X1-A)\}/(dA-A) = B - \{B*(X2-A')/(dA'-A')\}$$

can be converted to:

$$\{(B+1)*(X1-A)-(X1-A)\}/(dA-A) = B - \{(B+1)*(X2-A')-(X2-A')\}/(dA'-A') \ldots \quad (4)$$

In Equation 3, the execution of (B+1)*(X-A) is by a shifting method. A detailed description of the shifting method can be found in FIG. 4. Assuming B is the largest degree of membership, it is expressed in 4 bits as 1111. The value of B is stored into word N. To execute the procedure of B+1 is to advance word N 1 bit to word M, and setting all bits in word N to zero.

To execute a multiplication in equation (3) is the same as shifting the value of (X-A) into word M. This is because the value of word M is 1 which has no effect when it is used to multiply any number and similarly, when the word N has a value of zero, it can be used to multiply any number to turn it into zero.

An example for the shifting method can be shown as 9*9=81. If the shifting method is used, we can change the equation to (10-1)*9=81 first, and then move 9 to the ten's position of 10 and the one's position of 1 to achieve 90-9=81. The value has not changed. This shows the benefit of the shifting method. By using the shifting method, a multiplication function can be achieved without the use of a multiplying device.

Figure 3:
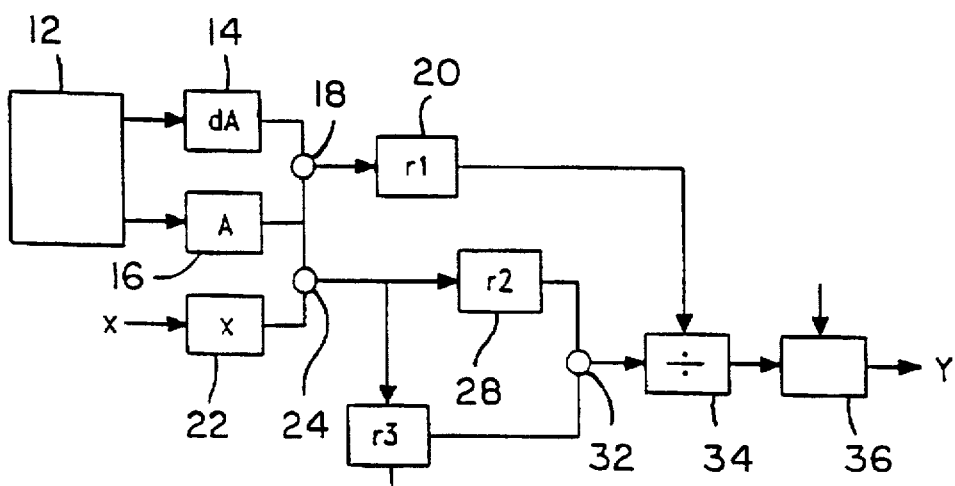
FIG. 3 is an implementation block diagram of the present invention method.

FIG. 3 shows an implementation block diagram for the present invention method. The method starts by first storing the membership function of the end point coordinate of the degree of membership function diagram into the fuzzy inference database 12 in a microprocessor. The data stored in the fuzzy database 12 are expressed in digital units based on the word size of the microprocessor. The coordinate data dA, A are horizontal coordinate value 14, 16 which are outputted from the fuzzy database 12 and processed by the subtraction device 18, to obtain (dA-A) which are then stored into the memory device 20. The variable input X, 22, is processed by another subtraction device 24 to obtain (X-A). The value of (X-A) is then stored into another memory device 26. The value of (X-A) is also stored into the higher bits area of memory device 28 to form the term (B+1) (X-A). The value of (B+1) (X-A) stored in memory 28 and the value of (X-A) stored in memory device 26 are then processed by the subtraction device 32 to obtain (B+1) (X-A)-(X-A). The value of (dA-A) from memory device 20 and the value of (B +1) (X-A)-(X-A) from the subtraction device 32 are then processed by a divider 34 for a divisional calculation. This is expressed as:

$$\frac{(B+1)(X-A)-(X-A)}{(dA-A)}$$

An arbiter 36 receives external signals to determine whether this is a positive slope or a negative slope. When it is a positive slope the result from the divider 34 is maintained while Y is outputted as the digital degree of membership function. When a negative slope is produced, the result from the divider 34 is subtracted from the value of B, and Y is outputted as the digital degree of membership function.

Figure 4:
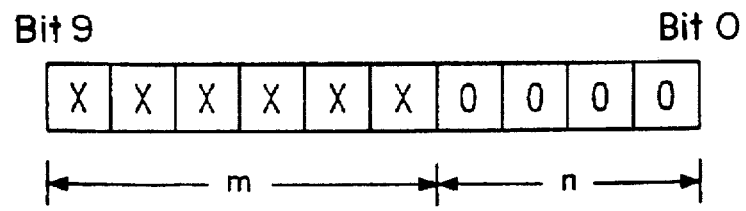
FIG. 4 is an implementation example of the memory calculation of the present invention.
Figure 5:
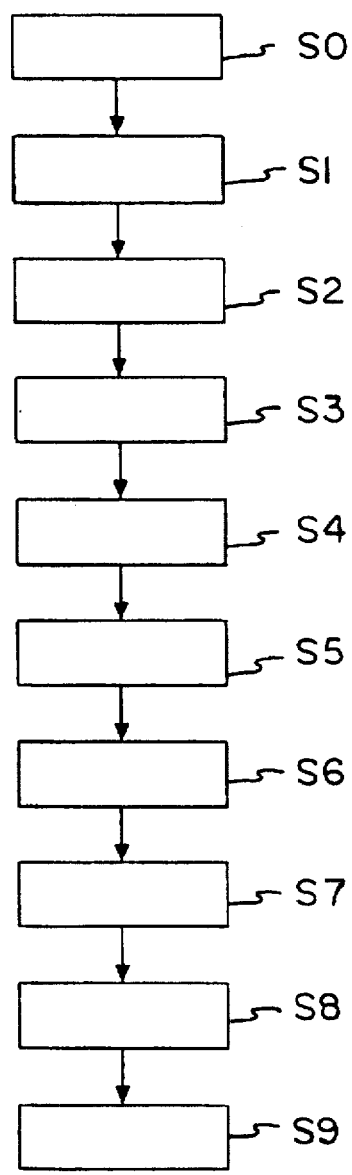
FIG. 5 is a flow diagram of the present invention method.

FIG. 4 shows an implementation example of memory device 28. It is shown that memory device 28 (r2) is a 10-bit register. A 6-bit digital data of (X-A) is store into bits 4 to 9.

It is shown that memory device 28 (r2) is a 10 bit register. It stores a 6 bit digital data of (X-A) into bits between and including bit 9 and bit 4. Zeros are placed from bit 3 to bit 0, setting B as 4 bits. This memory device is called numerator memory area.

The present invention method of generating the degree of membership in a fuzzy inference circuit can be summarized by the following steps:

1. Reading a first horizontal coordinate and a second horizontal coordinate from a first memory area, wherein the first horizontal coordinate is larger than the second horizontal coordinate, 2. Subtracting the second horizontal coordinate from the first horizontal coordinate to obtain a first difference, 3. Input variable data as the third horizontal coordinate. The third horizontal coordinate has a value between the first and the second horizontal coordinate, 4. Subtract the second horizontal coordinate from the third horizontal coordinate to obtain a second difference, 5. Move the second difference to a numerator memory area to obtain the result of a full scale degree of membership plus 1 and then multiply with the second difference, utilizing the shifting method in place of multiplication, 6. Subtract the second difference from the numerator memory area data to obtain the third difference, 7. Divide the third difference by the first difference to obtain the degree of membership function for the third horizontal coordinate.

8. Determine the sign of slope. If negative, the degree of member is B—(result of STEP 7); if positive, then keep the result from STEP 7.

An implementation example to illustrate the execution of the present invention method is shown below.

STEP 0. At the initial state, clear memory device 20, 28 and 26,

STEP 1. Read coordinate dA, A of the membership function of the degree of membership from the fuzzy database 12, STEP 2. Input data X of the variable value, STEP 3. Execute the calculation of (dA−A), and then store (dA−A) into memory device 20, STEP 4. Execute (X−A) calculation, and then store X−A into memory device 26, STEP 5. Store (X−A) into the highest bit area of the memory device 28 to obtain (B+1)*(X−A), STEP 6. (result of STEP 5)−(X−A), STEP 7. (result of STEP 6)/(dA−A), STEP 8. Receive external signal to determine whether it is a positive slope or a negative slope; if negative slope, execute B—(result of STEP 7); if positive slope, then keep result of STEP 7, STEP 9. Output data Y the degree of membership.

It has therefore been demonstrated that the conventional method utilizing a multiplying device is greatly simplified by the present invention method of calculating the degree of membership in a fuzzy inference circuit by the slope. This simplified procedure can reduce the circuit area, the manufacturing cost, and the memory space required in the microprocessor. Furthermore, the present invention degree of membership function not only can be applied in the slope of a straight line, it can also be applied to the degree of membership function for a triangle and trapezoid as long as the slope is constant.

While the present invention has been described in an illustrative manner, it should be understood that the terminology used is intended to be in a nature of words of description rather than limitation.

Furthermore, while the present invention has been described in terms of a preferred embodiment thereof, it is to be appreciated that those skilled in the art will readily apply these teachings to other possible variations of the invention.

The embodiments of the invention in which an exclusive property or privilege is claimed are defined as follows:

1. A method of generating a degree of membership in a fuzzy inference comprising the steps of:

reading a first horizontal coordinate and a second horizontal coordinate from a first memory zone, wherein said first horizontal coordinate is larger than said second horizontal coordinate, subtracting said second horizontal coordinate from said first horizontal coordinate to obtain a first difference, inputting a variable value data as a third horizontal coordinate, said third horizontal coordinate is in between said first and said second horizontal coordinates, subtracting said second horizontal coordinate from said third horizontal coordinate to obtain a second difference, executing a multiplication function by a shifting method to obtain the result of a full scale value add 1 to said full scale value and multiply by said second difference to obtain a value as a numerator memory area data, subtracting said second difference from said numerator zone data to obtain a third difference, dividing said third difference by said first difference to obtain a degree of membership of said third horizontal coordinates, and determining whether a positive or negative slope; when the slope is positive, then maintain the value of the degree of membership; when the slope is negative, then subtract the degree of membership of said third horizontal coordinate from said full scale degree of membership.

2. A method according to claim 1 further comprising the step of storing said first difference in a second memory zone.

3. A method according to claim 2 further comprising the step of storing said second difference into a third memory zone.

4. A method according to claim 3 further comprising the step of storing said numerator memory area data into a numerator memory area.

5. A method according to claim 4 further comprising the step of clearing said second, third and numerator memory area at the initial state.

6. A method according to claim 5, wherein said full scale degree of membership is expressed in a binary number with each bit as 1 and stored into word N.

7. A method according to claim 6, wherein said word N is advanced 1 bit into word M.

8. A method according to claim 7, wherein said second difference is moved into word M from said third memory zone and the bits in said word N are set to zero.

9. A method according to claim 1, wherein said first memory zone further includes membership function of the end-point coordinate of said degree of membership graph.

10. A method according to claim 1 further comprising the step of dividing said third difference by said first difference to obtain a degree of membership of said third horizontal coordinate.

11. A method according to claim 10, wherein the degree of membership of said third coordinate has a range between 0 and 1.

12. An apparatus for generating a degree of membership of a fuzzy inference comprising:

a first memory zone device for storing membership function, a first subtracting device for subtracting a second coordinate from a first coordinate to output a first difference, a second subtracting device for subtracting a second coordinate from a third coordinate of an input variable data to output a second difference, a numerator memory area device for storing numerator memory area data, to obtain the result of adding 1 to a full scale degree of membership function and then multiplying by said second difference, a third subtracting device for subtracting said second difference from said numerator memory area data, and a divider for dividing said numerator memory area data by said third difference and then outputting a degree of membership function of said third coordinate, and an arbiter for inputting slope signal and then when the slope is negative, subtracting said degree of membership function of said third coordinate from said full scale degree of membership.

13. An apparatus according to claim 12 further comprising a second memory zone device for storing said first difference.

14. An apparatus according to claim 13 further comprising a third memory zone device for storing said second difference.

15. An apparatus according to claim 14, wherein said second, third and numerator memory device are cleared at an initial state.

16. An apparatus according to claim 12, wherein when a positive slope signal is inputted, said degree of membership function is outputted.

* * * * *